(12) United States Patent
Wenzlick et al.

(10) Patent No.: US 6,671,934 B2
(45) Date of Patent: Jan. 6, 2004

(54) RETENTION CLIP (75) Inventors: Stanley J. Wenzlick, Chesaning, MI (US); Walter P. Kornylo, Livonia, MI (US)

(73) Assignee: Intier Automotive Inc., Aurora (CA)

( * ) Notice: Subject to any disclaimer, the term of this patent is extended or adjusted under 35 U.S.C. 154(b) by 0 days.

(21) Appl. No.: 10/170,485

(22) Filed: Jun. 13, 2002

(65) Prior Publication Data

US 2003/0145438 A1 Aug. 7, 2003

Related U.S. Application Data (60) Provisional application No. 60/353,388, filed on Feb. 1, 2002.

(51) Int. Cl.[7] ............................ A44B 21/00; B32B 3/02; F16B 21/00
(52) U.S. Cl. ............................ 24/295; 24/289; 24/292; 24/293; 24/458; 411/508; 296/189
(58) Field of Search .................... 24/295, 293, 292, 24/294, 289, 458, 517; 296/1.1, 189; 52/713, 716.7, 582.1; 411/508, 509

(56) References Cited

U.S. PATENT DOCUMENTS

| | | | | |
|---|---|---|---|---|
| 2,264,228 A | * | 11/1941 | Wagner | 24/295 |
| 2,708,779 A | * | 5/1955 | Tiger | 24/453 |
| 2,837,184 A | * | 6/1958 | Fernberg | 24/295 |
| 2,981,387 A | * | 4/1961 | Dutchik | 296/189 |
| 3,382,615 A | * | 5/1968 | Adell | 24/295 |
| 3,977,048 A | * | 8/1975 | Benedetti | 24/289 |
| 4,247,585 A | | 1/1981 | Hulten | |
| 4,663,210 A | * | 5/1987 | Schreiber et al. | 428/160 |
| 5,084,944 A | * | 2/1992 | Hileman | 24/453 |
| 5,288,121 A | | 2/1994 | Graves | |
| 5,347,690 A | | 9/1994 | Mansoor et al. | |
| 5,526,553 A | | 6/1996 | Klein | |
| 5,803,532 A | | 9/1998 | Karuppaswamy et al. | |
| 5,846,631 A | * | 12/1998 | Nowosiadly | 52/716.7 |
| 5,934,729 A | | 8/1999 | Baack | |
| 6,049,952 A | | 4/2000 | Mihelich et al. | |
| 6,101,686 A | | 8/2000 | Velthoven et al. | |
| 6,119,316 A | | 9/2000 | Ishihara et al. | |
| 6,132,154 A | | 10/2000 | Easter | |
| 6,220,645 B1 | | 4/2001 | Jacquemin | |

* cited by examiner

*Primary Examiner*—Victor Sakran
(74) *Attorney, Agent, or Firm*—Rader, Fishman & Grauer PLLC (57) ABSTRACT

A retention clip for securing a trim piece to a vehicle. The retention clip includes a trim piece affixing portion, a first leg member, and second leg member that extends from a head portion. The trim piece affixing portion is defined by at least one pair of grips that includes a plurality of retention barbs. Each first and second leg member is defined by a first leg portion, an intermediate knee portion, and a second leg portion. Each second leg portion is defined by a first and second length and a first and second deployment angle, respectively. The retention clip has a resilient retention feature that allows the retention clip to deform inwardly to during installation, then outwardly when affixing a trim piece to a vehicle in order to provide a perpendicular biasing force and a later, outboard biasing force.

34 Claims, 6 Drawing Sheets

RETENTION CLIP

RELATED APPLICATIONS

This application claims the benefit of U.S. Provisional Patent Application No. 60/353,388 filed Feb. 1, 2002.

TECHNICAL FIELD

The present invention relates to a fastener, and in particular to a retention clip for securing an interior trim piece to a vehicle.

BACKGROUND OF THE INVENTION

Interior trim pieces are usually affixed to the vehicle by a snap-type clip design. The snap-type clip design is usually a threaded fastener in the dashboard area that has a visibly exposed sharp edge directly facing the front seat vehicle occupants. Unfortunately, the visibly exposed sharp edge portion of the fastener does not meet strength and safety testing standards, for example, the direct head impact testing standard.

Figure 2A:
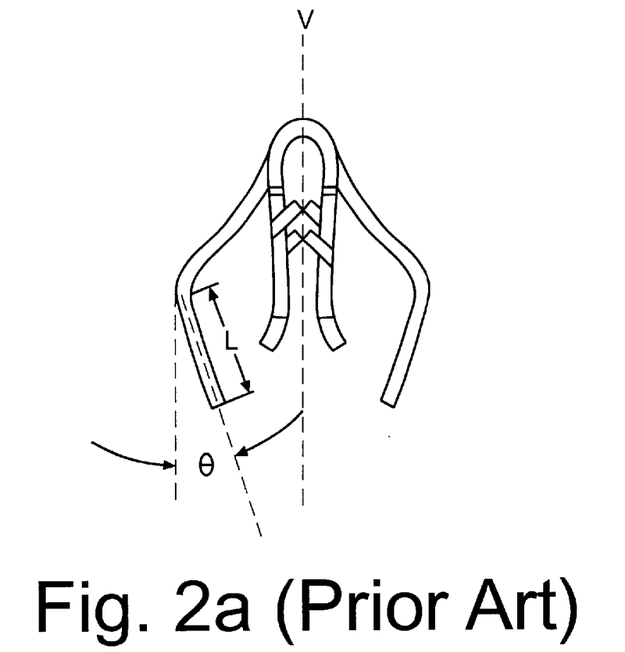
FIG. 2a is a front view of a conventional retention clip.

As a result of the fallbacks associated with snap-type clip designs, a retention clip design has been used in favor of the snap-type clip design to affix an interior trim piece to the vehicle. For example, as shown in FIG. 2a, prior retention clip designs have employed a mirror symmetric configuration (about a central vertical axis, V) with leg portions each extending from a knee portion and having a length, L, and an angle, θ, with respect to the vertical axis, V. Although adequate for most applications, this conventional design may not prevent the detachment of the trim piece from the vehicle during certain accident situations. Because the trim piece can become forcibly detached from the vehicle during certain accident situations, such as direct head impact testing, this design can be prone to fail current safety test standards, such as the direct head impact testing standard.

SUMMARY OF THE INVENTION

The inventors of the present invention have recognized these and other problems associated with conventional snap-type clip and retention clip designs and have developed a retention clip that can positively secure and lock a trim piece, such as an air deflector housing unit, to the dashboard area of a vehicle. The retention clip also is generally free of any sharp edges that may cause injury to the passenger.

The retention clip of the invention comprises a trim piece affixing portion, a first leg member, and a second leg member that extends from a head portion. The trim piece affixing portion is defined by at least one pair of grips that includes a plurality of retention barbs. Each first and second leg member is defined by a first leg portion, an intermediate knee portion, and a second leg portion. Each second leg portion is defined by a first and second length and a first and second deployment angle respectively, wherein the first length is greater than the second length.

Another embodiment of the invention comprises a generally U-shaped retention clip fastener that comprises a head portion, a trim piece affixing portion, a first leg member, and a second leg member. The trim piece affixing portion extends from the head portion and is defined by at least one pair of grips including a plurality of retention barbs that frictionally engages the trim piece extension member. The first and second leg members, which extend from the head portion, are defined by a first leg portion, an intermediate knee portion, and a second leg portion. The first leg member provides a lateral, outboard biasing force on a receiving wall surface of a dashboard. The second leg member, which is positioned on the outboard side of the trim piece, provides a perpendicular biasing force on the inner contacting surface of the dashboard. The first leg portion of the first and second leg members are symmetrically positioned about a vertical axis located centrally across the head portion. The second leg portion of the first and second leg members are defined by a first and second length respectively and a first and second deployment angle respectively. The first length is greater than the second length and the first deployment angle is greater than the second deployment angle.

Another embodiment of the invention comprises a retention clip for securing a trim piece to a dashboard area of a vehicle. The retention clip comprises means for affixing the retention clip to the trim piece and means for engaging the dashboard area with the retention clip.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
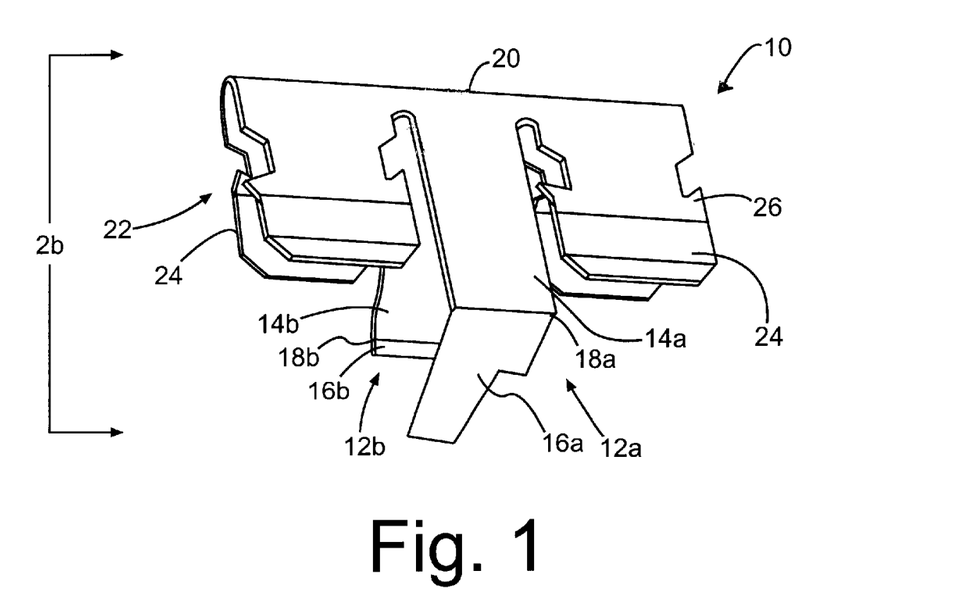
FIG. 1 is a perspective view of the retention clip according to an embodiment of the invention.

Referring now to FIG. 1, a retention clip, shown generally at 10, is illustrated according to an embodiment of the invention. The retention clip 10 is made of lightweight, generally rigid material having suitably resilient characteristics. An example of such a material for the retention clip 10 is spring steel, or the like. It will be appreciated that the invention is not limited by the type of material used for the retention clip 10, and that the invention can be practiced with any suitable material that allows the retention clip 10 to be positioned on the trim piece for subsequent attachment of the trim piece to the vehicle. In the illustrated embodiment, the retention clip 10 is first affixed to a trim piece (FIGS. 4b–4d, 5), such as an air deflector housing unit 100, which is then secured to the dashboard area 200 of a vehicle (FIGS. 3, 6a–6b).

Figure 2B:
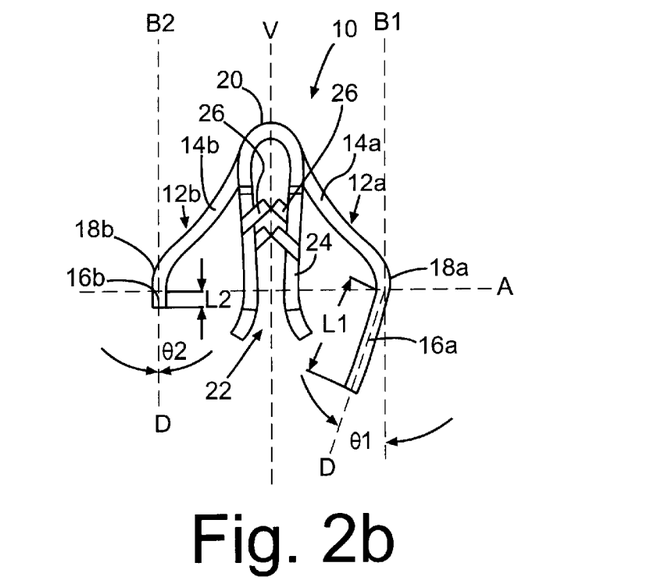
FIG. 2b is a front view of the retention clip of FIG. 1.

Referring now to FIGS. 1 and FIG. 2b, the retention clip 10 is generally defined as having a generally U-shape or V-shape in cross-section and having means for engaging the dashboard area of a vehicle, such as a pair of leg members 12a, 12b. Each leg member 12a, 12b is generally defined as having first leg portions 14a, 14b and second leg portions 16a, 16b that are further defined by intermediate knee portions 18a, 18b. The first leg portions 14a, 14b extend from a generally rounded base or head portion 20 as the second leg portions 16a, 16b extend from the intermediate knee portions 18a, 18b, respectively. In the illustrated embodiment (FIG. 2b), the first leg portions 14a, 14b that extend from the head portion 20 are shown to be positioned symmetrically about the vertical axis, V, which is referenced from and perpendicular to horizontal axis, A.

Figure 6A:
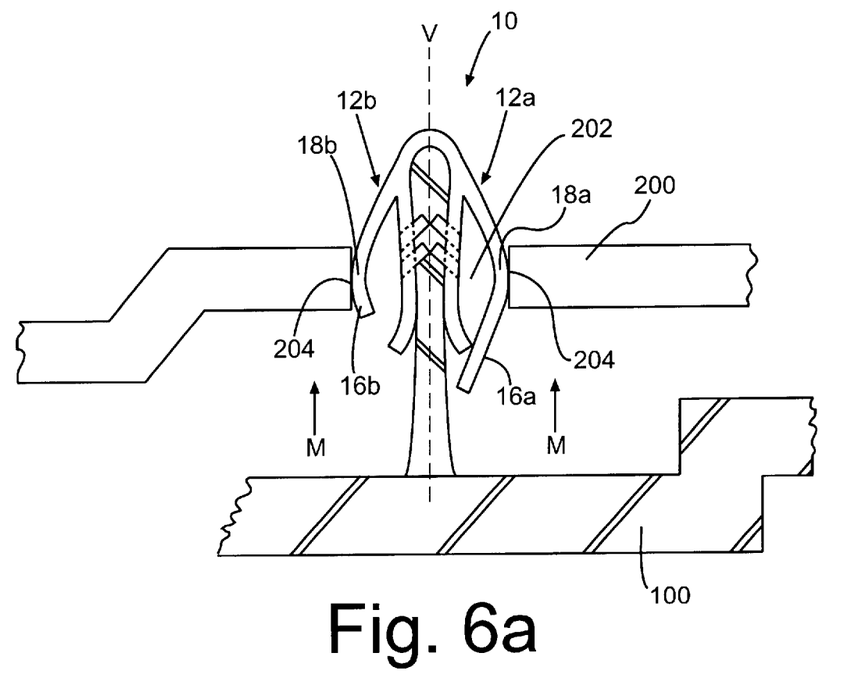
FIG. 6a is a cross-sectional view of the air deflector housing unit and retention clip similar to FIG. 5 when the retention clip of the invention is partially inserted into the dashboard area.
Figure 6B:
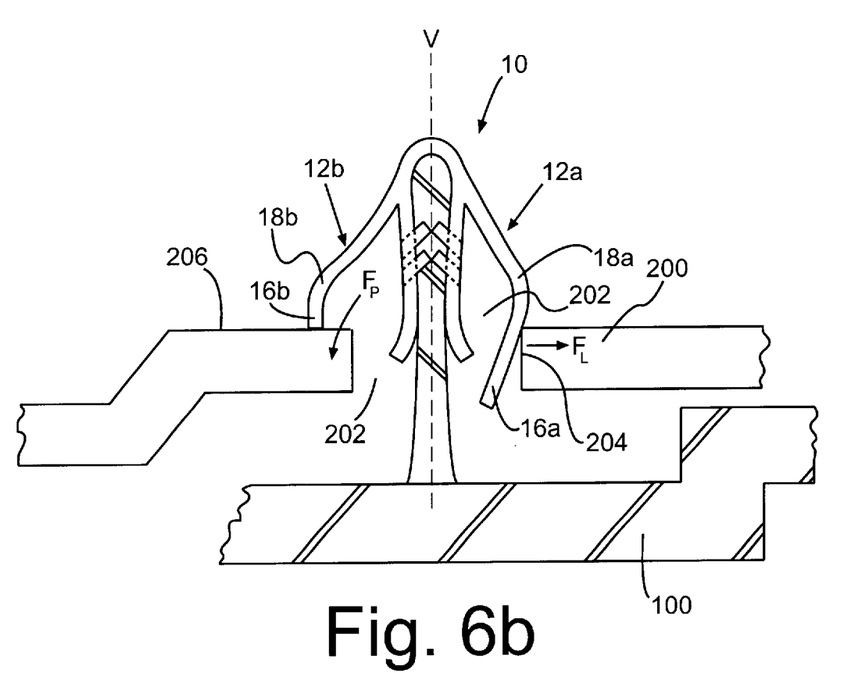
FIG. 6b is a cross sectional view of the air deflector housing unit and retention clip similar to FIG. 5 when the retention clip of the invention is fully inserted into the dashboard area.

The second leg portions 16a, 16b are designed with unique lengths and angles that lock and retain the air deflector housing unit 100 to a dashboard area 200 (FIG. 6b). Each second leg portion 16a, 16b extends from the knee portions 18a, 18b, at a predetermined length L1, L2, and angle θ1, θ2, with respect to the vertical axis, V, respectively. The second leg portion 16a is defined by a length L1 and an angle θ1. The second leg portion 16b is defined by a length L2 and an angle θ2, which preferably faces the outboard side of the air deflector housing unit 100. Each second leg portion 16a, 16b is deployed at selected deployment angles θ1 and θ2 that are defined as the angle between the longitudinal lines B1, B2 and dashed lines D, respectively. Lines B1 and B2 are generally shown across the most central portion of the knees 18a, 18b, which perpendicularly meet with horizontal axis A. One aspect of the invention is that the length L1 of the second leg portion 16a is greater than the length L2 of the second leg portion 16b. Depending on the design of the dashboard area 200, the design of the length L2 may be greater than or equal to zero. Preferably, the angle, θ1, is greater than that of the angle, θ2. Advantages for the respective lengths L1, L2 and angles θ1, θ2 are explained below in FIG. 6b.

Figure 3:
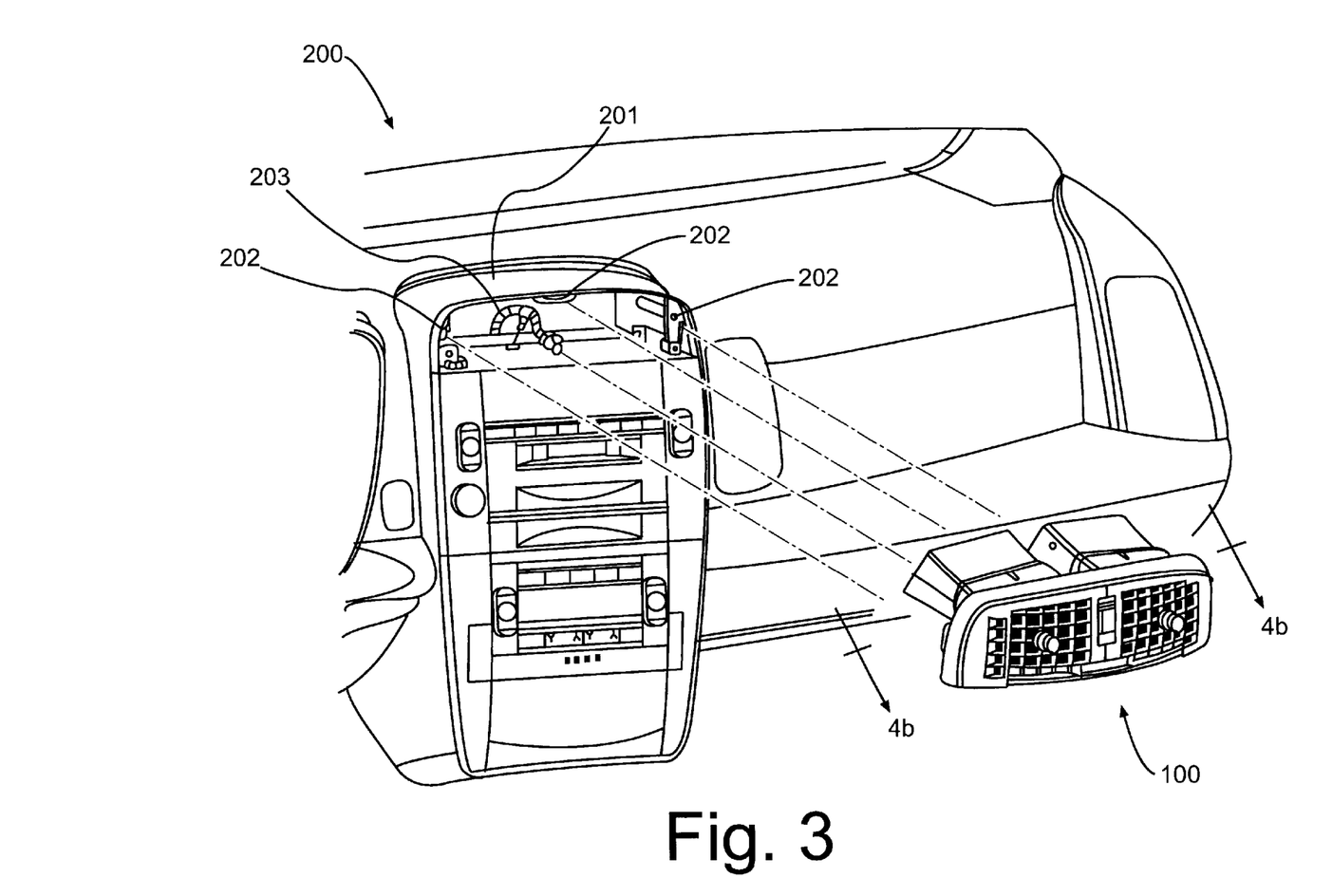
FIG. 3 is a perspective front view of the dashboard assembly and air deflector housing unit.
Figure 4A:
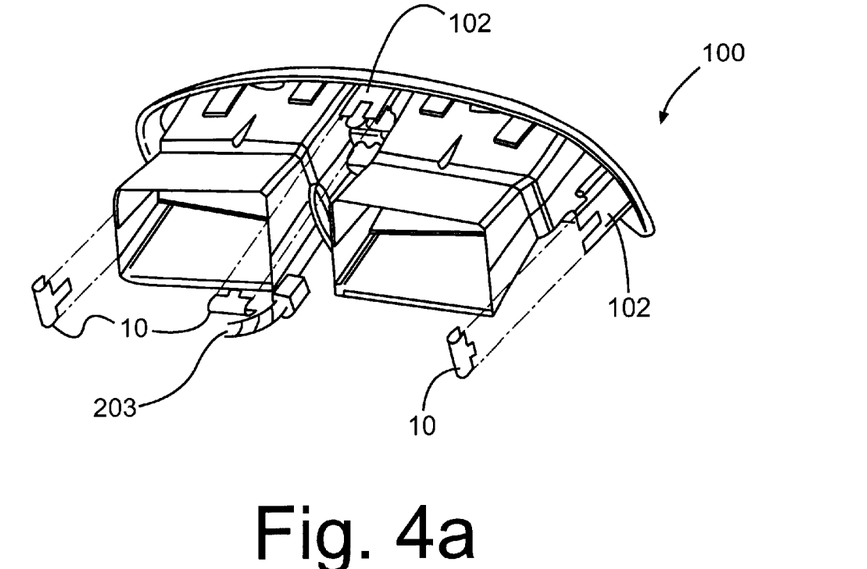
FIG. 4a is a perspective rear view of the air deflector housing unit of FIG. 3 prior to the attachment of the retention clip of FIG. 1.
Figure 4B:
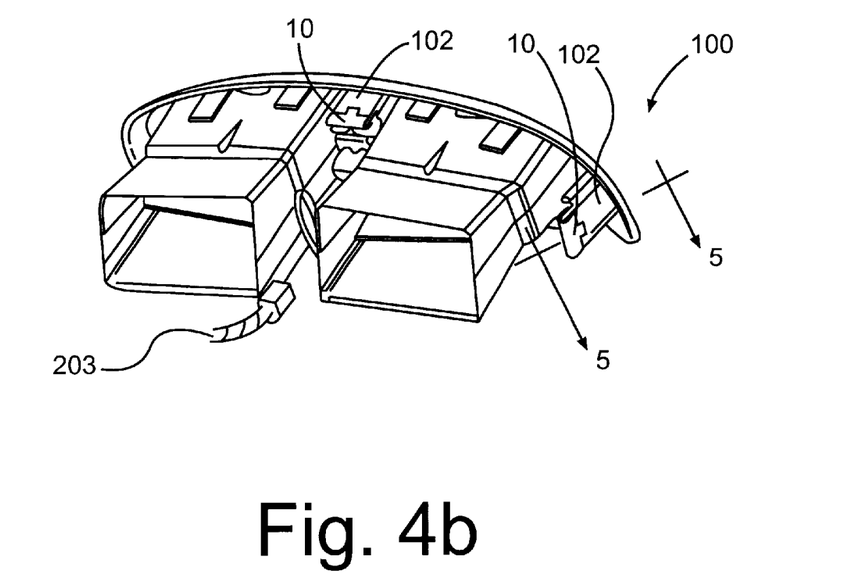
FIG. 4b is a perspective rear view of the air deflector housing unit of FIG. 3 after the attachment of the retention clip of FIG. 1.
Figure 4C:
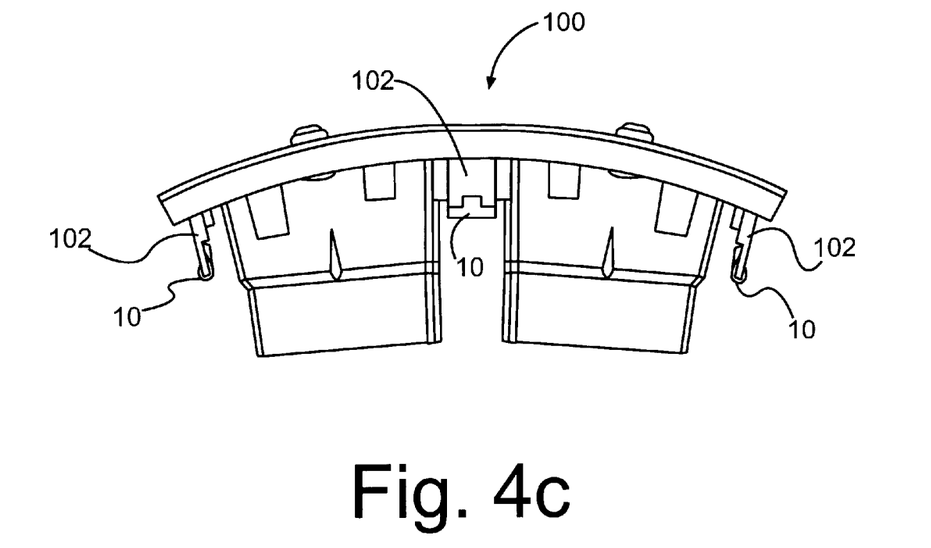
FIG. 4c is a top view of the air deflector housing unit of FIG. 4b.
Figure 4D:
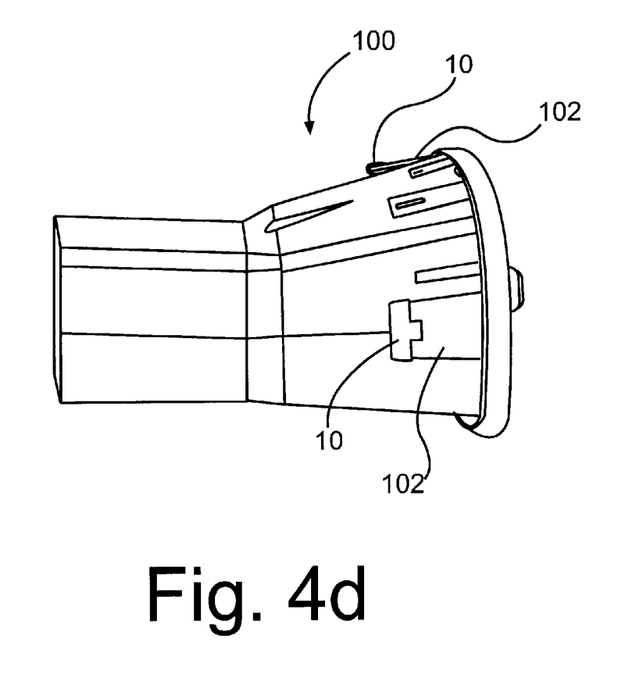
FIG. 4d is a side view of the air deflector housing unit of FIG. 4b.

As seen in FIGS. 3 and 4a–4d, the air deflector housing unit 100 is prepared for assembly to the vehicle by first affixing the retention clips 10 at selected retention clip receiving locations 102 (FIGS. 4a–4d) before the air deflector housing unit 100 is attached to a "horse-collar" area 201 of the dashboard area 200 at dashboard receiving portions 202 (FIG. 3). For example, the retention clips 10 can be positioned at three receiving locations 102, such as the left side, right side, and top portion of the air deflector housing unit 100 (FIGS. 4b–4d). Although other clip receiving locations are contemplated, the three-point location provides added strength as well as the limited movement of the air deflector housing unit 100 once the housing unit 100 is affixed to the dashboard area 200. An electrical connection or hazard control lead 203 for a hazard switch may extend from the dashboard area 200 and connect to the air deflector housing unit 100 (FIGS. 3, 4a–4b).

To assist in affixing the retention clip 10 to the air deflector housing unit 100, the retention clip 10 is further defined by means for affixing the retention clip 10 to the trim piece, such as a trim piece affixing portion 22 (FIGS. 1, 2b). The trim piece affixing portion 22 is designed to grip each side of a trim piece extension member 104 (FIG. 5) with a pair of grips or legs 24. The trim piece extension 104 is located at each receiving location 102. The trim piece affixing portion 22 may further include a plurality of retention barbs 26 that may frictionally engage the trim piece extension 104 by gripping or biting into the trim piece extension member 104. The plurality of retention barbs 26 may be arranged to be non-perpendicular to the vertical axis, V, to facilitate the gripping or biting into the trim piece extension member 104. In addition, the retention barbs 26 provide a strengthened relationship of the retention clip 10 and trim piece extension member 104. Alternatively, the trim piece extension member 104 may include a plurality of barb receiving portions 106 that provide an increased affixing strength of the retention clip 10 to the trim piece extension member 104. The plurality of barb receiving portions 106 are designed to receive the retention barbs 26, rather than allowing the barbs 26 to simply grip or bite into the trim piece extension member 104. Regarding of using either the plurality of barbs 26 or the plurality of barb receiving portions 106, when the head portion 20 contacts a top portion 108 of the trim piece extension member 104, the air deflector housing unit 100 is prepared for installation in the dashboard 200.

Figure 5:
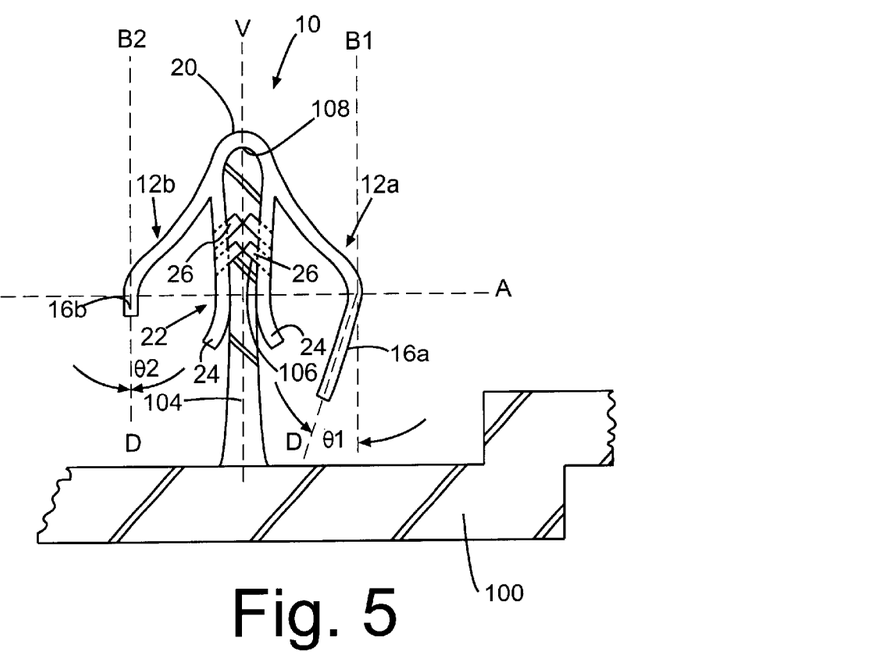
FIG. 5 is a cross-sectional view of the retention clip of FIG. 1 attached to the air deflector housing unit taken along line 5—5 of FIG. 4b.

As shown in FIG. 5, the retention clip 10 is affixed to the air deflector housing unit 100, at each trim piece extension 104, which generally retains the angles θ1, θ2 when the retention clip 10 is in an "at rest" state. Here, the retention clip 10 is affixed to the trim piece 100 such that the second leg member 12b is positioned toward the outboard side of the trim piece 100. The trim piece extension 104 causes the trim piece affixing portion 22 to deform outwardly away from the vertical axis, V, while the resilient nature of the retention clip 10 causes the trim piece affixing portion 22 to grip the trim piece extension 104. Referring also to FIG. 2b, the deployment angle, θ1, when the retention clip 10 is in the "at rest" state is approximately 15 degrees. In other words, the second leg portion 16a is biased inwardly 15 degrees from B1 toward V. The deployment angle, θ2, when the retention clip 10 is in the "at rest" state is approximately 0 degrees. In other words, the second leg portion 16b is substantially parallel to the vertical axis, V. Although the first and second leg members 12a, 12b are shown in an at rest state in FIG. 5, the trim piece affixing portion 22 is affixed to and securely grips the trim piece extension member 104.

As shown in FIG. 6a, the retention clip 10 is affixed to the trim piece 100 and partially inserted into a receiving wall surface 204 of the dashboard area 200 at one of the dashboard receiving portions 202. As the retention clip 10 is inserted into the receiving wall surface 204, the leg members 12a, 12b are compressed toward the vertical axis, V. Specifically, the compression of the retention clip 10 by a portion of the receiving wall surface 204 causes the deployment angle, θ1, of the first leg member 12a to deform inwardly to approximately 45 degrees with respect to the vertical axis, V. In other words, the second leg portion 16a is deformed inwardly an additional 30 degrees from its original "at rest" state deployment angle of approximately 15 degrees toward the vertical axis, V. Likewise, the deployment angle, θ2, of the second leg member 12b deforms inwardly to approximately 45 degrees with respect to the vertical axis, V. In other words, the second leg portion 16b is deformed inwardly approximately 45 degrees from its original "at rest" state deployment angle of approximately 0 degrees toward the vertical axis, V.

The retention clip 10, as explained above, retains approximately same angular displacement at approximately 45 degrees for deployment angles θ1, θ2 as long as the knee portions 18a, 18b contact the receiving wall surface 204 of the dashboard area 200. As the retention clip 10 and trim piece 100 is completely inserted into the dashboard receiving portion 202 in the direction shown by the arrows M, the knee portions 18a, 18b will eventually no longer engage the receiving wall surface 204 and will enter the area behind the dashboard area 200 so that the retention clip 10 may advantageously lock into place.

As seen in FIG. 6b, once the retention clip 10 is fully inserted into the dashboard receiving portion 202, the resilient nature of the retention clip 10 causes the deployment angles θ1, θ2 of the second leg portions 16a, 16b to move outwardly from the vertical axis, V. The second leg portion 16a comes to rest in a deployment angle of approximately 25 degrees with respect to the vertical axis, V. In other words, the second leg portion 16a is deformed inwardly at approximately an additional 10 degrees from its original "at rest" state of approximately 15 degrees with respect to the vertical axis, V. Likewise, the deployment angle, θ2, of the second leg portion 16b moves outwardly from the vertical axis, V. However, the second leg portion 16b comes to rest in a deployment angle of approximately 0 degrees from its original "at rest" state with respect to the vertical axis, V. In other words, the second leg portion 16b substantially resumes its original "at rest" state deployment angle of approximately 0 degrees with respect to B2 and the vertical axis, V. Thus, the a tip 28 of the second leg portion 16b is substantially perpendicular to the inner contacting surface 206 of the dashboard area 200 and locks the trim piece 100 securely into place. As a result, the second leg member 12b can withstand a higher load in a direction perpendicular to the dashboard area 200 than the first leg member 12a. Thus, the second leg portion 16b exerts a perpendicular biasing force, $F_P$, on the inner surface 206 of the dashboard area 200 when impact forces attempt to push the trim piece 100 away from the dashboard area 200 (i.e. opposite to arrows M shown in FIG. 6a).

In addition, the second leg portion 16a of first leg member 12a provides a lateral, outboard biasing force, $F_L$, to bias the retention clip 10 toward the outboard side of the trim piece 100. As a result of the lateral biasing force, $F_L$, the first leg member 12a helps prevent undesirable lateral movement of the trim piece 100 in the dashboard 200 when impact forces attempt to push the trim piece 100 away from the dashboard area 200.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A retention clip for securing a trim piece to a vehicle, comprising:
   a head portion;
   a first leg member that extends from the head portion; and
   a second leg member that extends from the head portion,
   wherein a length of one of the first and second leg members is greater than a length of the other one of the first and second leg members, and
   wherein a leg portion of the first and second leg members define a first and second deployment angle with respect to a vertical axis centrally located across the head portion, respectively, and
   wherein the first deployment angle is greater than the second deployment angle.

2. The retention clip according to claim 1, wherein the retention clip is made from a spring steel material.

3. The retention clip according to claim 1, wherein a first leg portion of the first and second leg members are symmetrically positioned about a vertical axis centrally located across the head portion.

4. The retention clip according to claim 1, wherein the first deployment angle is approximately 15 degrees with respect to the vertical axis when the retention clip is in an at rest state.

5. The retention clip according to claim 1, wherein the second deployment angle is approximately 0 degrees with respect to the vertical axis when the retention clip is in an at rest state.

6. The retention clip according to claim 1, wherein a second leg member is positioned on an outboard side of the trim piece.

7. The retention clip according to claim 1, wherein a second leg portion of the first leg member is further defined by a deployment angle that is approximately 25 degrees with respect to a vertical axis centrally located across the head portion when the retention clip is fully inserted into the trim piece.

8. The retention clip according to claim 1, wherein a second leg portion of the second leg member is further defined by a deployment angle that is approximately 0 degrees with respect to a vertical axis centrally located across the head portion when the retention clip is fully inserted into the trim piece.

9. The retention clip according to claim 1, wherein the first leg member provides a lateral, outboard biasing force when the retention clip is fully inserted into the trim piece.

10. The retention clip according to claim 1, wherein the second leg member provides a perpendicular biasing force when the retention clip is fully inserted in the trim piece.

11. The retention clip according to claim 1, wherein each of the first and second leg members include a first and second leg portion, and wherein a length of one of the first and second leg portions is approximately greater than or equal to zero.

12. The retention clip according to claim 1, further comprising a trim piece affixing portion that extends from the head portion defined by at least one pair of grips including a plurality of retention barbs.

13. A generally U-shaped retention clip for securing an air deflector housing unit to a dashboard area of a vehicle, the air deflector housing unit comprising a trim piece extension member, wherein the trim piece extension member is defined by retention clip receiving locations that correlate to the left, right, and top portion of the air deflector housing unit, the dashboard area defined by an inner contacting surface and a receiving wall surface, comprising:
   a head portion;
   a first leg member that provides a lateral, outboard biasing force on the receiving wall surface of the dashboard, wherein the first leg member extends from the head portion, wherein the first leg member is defined by a first leg portion, an intermediate knee portion, and a second leg portion having a length; and
   a second leg member positioned on the outboard side of the trim piece that provides a perpendicular biasing force on the inner contacting surface of the dashboard, wherein the second leg member extends from the head portion, wherein the second leg member is defined by a first leg portion, an intermediate knee portion, and a second leg portion having a length,
   wherein the first leg portion of the first and second leg members are symmetrically positioned about a vertical axis located centrally across the head portion, wherein the second leg portion of the first and second leg members are define a first and second deployment angle, respectively, and
   wherein the length of the first leg portion is greater than the length of the second leg portion, and wherein the first deployment angle is greater than the second deployment angle.

14. The retention clip according to claim 13, wherein the first deployment angle is approximately 15 degrees with respect to the vertical axis.

15. The retention clip according to claim 13, wherein the second deployment angle is approximately 0 degrees with respect to the vertical axis.

16. The retention clip according to claim 13, wherein the second leg portion of the first leg member is further defined by a deployment angle that is approximately 25 degrees with respect to the vertical axis.

17. The retention clip according to claim 13, wherein the second leg portion of the second leg member is further defined by a deployment angle that is approximately 0 degrees with respect to the vertical axis.

18. The retention clip according to claim 13, wherein the length of one of the first and second leg portions is approximately greater than or equal to zero.

19. The retention clip according to claim 13, further comprising a trim piece affixing portion that extends from the head portion, wherein the trim piece affixing portion is defined by at least one pair of grips including a plurality of retention barbs that frictionally engages the trim piece extension member.

20. A retention clip for securing a trim piece to a dashboard area of a vehicle, comprising:

means for affixing the retention clip to the trim piece; and means for engaging the dashboard area with the retention clip to positively secure the trim piece to the dashboard area of the vehicle, wherein said engaging means comprises first and second deployment angles with respect to the vertical axis centrally located across said affixing means respectively, and wherein the first deployment angle is greater than the second deployment angle.

21. The retention clip according to claim 20, wherein said affixing means comprises a trim piece affixing portion that extends from a head portion defined by at least one pair of grips including a plurality of retention barbs.

22. A retention clip for securing a trim piece to a vehicle, comprising:

a head portion;

a first leg member that extends from the head portion; and a second leg member that extends from the head portion, wherein a leg portion of the first and second leg members define a first and second deployment angle with respect to a vertical axis centrally located across the head portion, respectively, and wherein the first deployment angle is greater than the second deployment angle.

23. The retention clip according to claim 22, wherein the first leg member is defined by a first leg portion, an intermediate knee portion, and a second leg portion having a length, and wherein the second leg member is defined by a first leg portion, an intermediate knee portion, and a second leg portion having a length.

24. The retention clip according to claim 22, wherein the retention clip is made from a spring steel material.

25. The retention clip according to claim 22, wherein a first leg portion of the first and second leg members are symmetrically positioned about a vertical axis centrally located across the head portion.

26. The retention clip according to claim 22, wherein the first deployment angle is approximately 15 degrees with respect to the vertical axis when the retention clip is in an at rest state.

27. The retention clip according to claim 22, wherein the second deployment angle is approximately 0 degrees with respect to the vertical axis when the retention clip is in an at rest state.

28. The retention clip according to claim 22, wherein a second leg member is positioned on an outboard side of the trim piece.

29. The retention clip according to claim 22, wherein a second leg portion of the first leg member is further defined by a deployment angle that is approximately 25 degrees with respect to a vertical axis centrally located across the head portion when the retention clip is fully inserted into the trim piece.

30. The retention clip according to claim 22, wherein a second leg portion of the second leg member is further defined by a deployment angle that is approximately 0 degrees with respect to a vertical axis centrally located across the head portion when the retention clip is fully inserted into the trim piece.

31. The retention clip according to claim 22, wherein the first leg member provides a lateral, outboard biasing force when the retention clip is fully inserted into the trim piece.

32. The retention clip according to claim 22, wherein the second leg member provides a perpendicular biasing force when the retention clip is fully inserted in the trim piece.

33. The retention clip according to claim 22, wherein each of the first and second leg members include a first and second leg portion, and wherein a length of one of the first and second leg portions is approximately greater than or equal to zero.

34. The retention clip according to claim 22, further comprising a trim piece affixing portion that extends from the head portion defined by at least one pair of grips including a plurality of retention barbs.

* * * * *